(12) United States Patent
Randerath et al.

(10) Patent No.: US 9,449,274 B2
(45) Date of Patent: Sep. 20, 2016

(54) METHOD AND DEVICE FOR PREDICTING THE CONDITION OF A COMPONENT OR SYSTEM, COMPUTER PROGRAM PRODUCT

(71) Applicant: AIRBUS OPERATIONS GMBH, Hamburg (DE)

(72) Inventors: Bernhard Randerath, Assel (DE); Mike Gerdes, Hamburg (DE); Dieter Scholz, Neu Wulmstorf (DE)

(73) Assignee: Airbus Operations GmbH, Hamburg (DE)

( * ) Notice: Subject to any disclaimer, the term of this patent is extended or adjusted under 35 U.S.C. 154(b) by 494 days.

(21) Appl. No.: 14/089,145

(22) Filed: Nov. 25, 2013

(65) Prior Publication Data

US 2014/0156570 A1    Jun. 5, 2014

Related U.S. Application Data

(63) Continuation of application No. PCT/EP2012/060184, filed on May 30, 2012.

(60) Provisional application No. 61/491,397, filed on May 31, 2011.

(30) Foreign Application Priority Data

May 31, 2011 (DE) .................. 10 2011 076 779

(51) Int. Cl.
*G06N 5/04* (2006.01)
*G06N 5/02* (2006.01)
*G05B 23/02* (2006.01)
*G06N 99/00* (2010.01)

(52) U.S. Cl.
CPC .............. *G06N 5/02* (2013.01); *G05B 23/024* (2013.01); *G06N 99/005* (2013.01); *G06N 5/04* (2013.01)

(58) Field of Classification Search
None
See application file for complete search history.

(56) References Cited

U.S. PATENT DOCUMENTS

| 7,567,704 B2 | 7/2009 | Au et al. |
| 7,773,799 B2 | 8/2010 | Oldroyd |
| 2005/0120391 A1 | 6/2005 | Haynie et al. |

(Continued)

OTHER PUBLICATIONS

Deng, Omega: On-Line Memory-Based General Purpose System Classifier, Doctoral thesis, CMU-RI-TR-98-33, Carnegie Mellon University, Nov. 1998, pp. 1-177.*

(Continued)

*Primary Examiner* — Wilbert L Starks
(74) *Attorney, Agent, or Firm* — Jenkins, Wilson, Taylor & Hunt, P.A.

(57) ABSTRACT

A device method and computer program product are disclosed for trend prediction of the course of a time-dependent series of data points of a component or system, particularly for an aircraft or spacecraft, including: providing an optimised decision tree, the input node of which is provided for inputting an input vector, the nodes of which contain the data points of a respective input vector and the leaves of which each contain an extrapolation function; iteratively calculating future data points by a respective time-dependent series of data points being inputted into the decision tree as an input vector and the decision tree calculating therefrom a data point subsequent to the last data point of the input vector in an automated manner, the calculated subsequent data point being added to the time-dependent series of data points in order to be used as a new input vector for the next iteration step.

15 Claims, 2 Drawing Sheets

(56) References Cited

U.S. PATENT DOCUMENTS

2009/0245577 A1  10/2009  Liu et al.
2011/0040470 A1   2/2011  Qiu

OTHER PUBLICATIONS

Chinese Office Action for Application No. 201280026663.X dated Jun. 30, 2015.
Kessler, S et al., "Pattern Recognition for Damage Characterization in Composite Materials," in: 48th AIAA/ASME/ASCE/AHS/ASC Structures, Structural Dynamics, and Materials Conference, Apr. 2007.
Bottcher, M et al., "An Algorithm for Anticipating Future Decision Trees from Concept-Drifting Data." vol. 1, London : Springer, 2009, Research and Development in Intelligent Systems XXV, 293-306.
Shukla S K et al., "Soft decision trees: A genetically optimized cluster oriented approach," Expert Systems With Applications, Oxford, GB, vol. 36, No. 1, Jan. 1, 2009, pp. 551-563.
Hirose H et al., "Diagnosis Accuracy in Electric Power Apparatus Conditions Using Classification Methods," IEEE Transactions on Dielectrics and Electrical Insulation and Electrical Insulation, IEEE Service Center, Piscataway, NJ, U.S., vol. 17, No. 1, Feb. 1, 2010, pp. 271-279.
German Office Action for Application No. 10 2011 076 779.7 dated Oct. 19, 2011.
International Search Report for Application No. PCT/EP2012/060184 dated Jul. 10, 2012.

\* cited by examiner

METHOD AND DEVICE FOR PREDICTING THE CONDITION OF A COMPONENT OR SYSTEM, COMPUTER PROGRAM PRODUCT

CROSS-REFERENCES TO RELATED APPLICATIONS

This application is a continuation of and claims priority to International Patent Application No. PCT/EP2012/060184, filed May 30, 2012, which claims the benefit of and priority to U.S. Provisional Application No. 61/491,397, filed May 31, 2011, German patent application No. 10 2011 076 779.7, filed May 31, 2011, and the entire disclosures of which are incorporated herein by reference.

TECHNICAL FIELD

The present invention relates to a computer-implemented method and a device for predicting the condition of a component or system, in particular for an aircraft or spacecraft, by trend prediction of the course of a time-dependent series of data points determined at the component or system by measuring. The present invention further relates to a computer program product.

BACKGROUND

The analysis of a pool of data which is determined by measuring, including the statistical analysis of the reciprocal relationship between the data and the data correlations thereof and the analysis with respect to the future development of these data, that is to say what is known as trend prediction, is a wide-ranging field of application. For trend prediction, trend models are usually created which are based on the traditional approach of time series analysis. Trend analysis and trend prediction are statistical tools which make it possible to better interpret measured data or also data determined in another way. Trend analysis can be used for trend prediction in order to be able to make and verify statements relating to the trend of the measured data.

Although a time-dependent series of data points determined by measuring can in principle be used in any trend prediction method, the present invention and the problem addressed thereby are described in the following with respect to a method and a device for trend prediction which is for use in an aircraft or spacecraft. In particular, the present invention is described in the following with respect to trend prediction with reference to measured oscillations at a component or system of an aircraft.

A method for predicting the failure of gas turbines in an aircraft is described for example in US 2011/0040470 A1.

In aircraft, in particular in passenger aircraft, for safety reasons alone fixed predetermined maintenance intervals are always to be observed, within which the components and systems of an aircraft have to be checked, serviced and repaired. These intervals are determined in such a way that it is ensured that the respective components and systems are sufficiently safe and functional until the next maintenance interval. Therefore, the corresponding maintenance intervals are typically selected together with a slack time so as to be correspondingly well-spaced.

However it is problematic that, using this approach, systems of an aircraft are also sometimes serviced despite the fact that they are, for example, still fully functional and that the maintenance thereof is in fact unnecessary. It is thus clear that in this way, due to unnecessary maintenance which is nevertheless carried out without knowledge of the actual circumstances, additional costs are incurred.

In addition, for passenger aircraft for example, the time periods available for maintenance work are only very short. Conventionally, this work is carried out during immobilisation times of the aircraft between the arrival of an aircraft at the terminal and it leaving the terminal again, for which usually only a short time period of approximately 90 minutes is available. This means that it is thus desirable to collect previously corresponding findings relating to the condition of a system or component in the aircraft.

The air-conditioning system, which is usually also referred to as HVAC (heat, ventilating and air conditioning), is particularly significant in an aircraft both with respect to functionality and for the comfort of the passengers. The air-conditioning system is intended both to supply the passengers in an aircraft with fresh, temperate air and to cool electronic systems. For this purpose, the air-conditioning system uses recirculation fans and filters to make it possible to circulate and thus clean the cabin air. The filters used can, however, become blocked over time, associated supply lines can become dirty and the fans can for example become faulty, for example due to failures of the electric motors or due to fractures of the fan blades. Here, it is problematic that blockage of the filters in particular is very difficult to predict since it always depends on the surroundings of the respective filters and the field of application. This thus results in these filters being checked very frequently on site, and this involves additional checking time during the immobilisation times of the aircraft.

This is a situation which understandably is to be avoided.

SUMMARY OF THE INVENTION

In this context, one idea of the present invention is to be able to provide improved trend prediction for a component or system, in particular in the case of use in an aircraft or spacecraft.

Accordingly, there is provided:

a computer-implemented method for predicting the condition of a component or system, in particular for an aircraft or spacecraft, by trend prediction of the course of a time-dependent series of data points determined at the component or system by measuring, comprising the steps: providing an optimised decision tree, the input node of which is provided for inputting an input vector, the nodes of which contain the attributes of the respective input vector and the leaves of which each contain an extrapolation function provided for trend prediction; iteratively calculating future data points by an input vector being derived from a time-dependent series of data points and the decision tree calculating a data point subsequent to the last data point of the time-dependent series of data points from the input vector in an automated manner, the calculated subsequent data point being added to the time-dependent series of data points in order to be used to form a new input vector for the next iteration step.

a device for predicting the condition of a component or system, in particular for an aircraft or spacecraft, comprising a measuring device which is configured so as to measure a physical measured value at the component or system for generating a time-dependent series of data points; comprising a memory in which at least one time-dependent series of data points can be stored; comprising a calculation and evaluation device which is configured so as to generate an optimised decision tree with reference to at least one of the time-dependent series of data points and to carry out a trend prediction with reference to the thus generated decision tree.

A computer program product in which a computer program is stored which is configured so as to execute a method according to the invention.

The understanding on which the invention is based consists in that most systems have characteristic, system-inherent operating properties which allow for conclusions to be drawn on the properties and the condition of the respective systems. For example, oscillations at a system or component or the temperature thereof can be measured at approximately regular intervals. The concept is that the data collected in this manner is a measurement of the condition and the properties of the system to be examined or of the associated component. With suitable interpretation of these data, conclusions can be drawn on the changes in the properties and the condition of this system or component. In particular under the premise that the condition of a system or component deteriorates rather than improves as service life increases, conclusions can be drawn on the probable further development of the condition of the system or component by drawing on additional assumptions and by using a suitably obtained decision tree.

Using trend analysis, the trend of the future course of the analysed measurement data is estimated by an approximate analysis model initially being constructed and then being optimised. The analysis model is formed by a suitably selected decision tree. For this analysis model, it is not necessary to know precisely the nature of the object to be examined, for example the physical properties and construction thereof and the like. By means of the trend analysis, it is now possible to draw conclusions on the nature, the precise construction and the properties of the object to be examined by means of the analysis model by analysing and evaluating the data. Corresponding systems, for example, can thus be checked with respect to the servicing and maintenance requirements.

The present invention makes it possible to make an automated trend prediction for components and systems to be examined, particularly those within an aircraft, without specific knowledge of mathematical concepts. The trend analysis is carried out according to the invention on the basis of a time series analysis of measured data, from which what are known as data points are derived. A data point denotes a discrete data value of a data signal, which for example has been determined by sampling or also by another means. A time series denotes a time-dependent series of data points, which usually do not represent a series in the mathematical sense. Time series analysis is a discipline which relates to the mathematical-statistical analysis of time series and to the prediction of the future development thereof, or what is known as a trend.

For trend prediction, a suitable extrapolation function is required which models the probable course of the data as well as possible. For this purpose, a suitably selected decision tree is initially provided, which is used according to the invention for selecting the extrapolation function required for analysis and evaluation. In this case, the decision tree is derived from measured data. By means of a suitable learning or training concept, which is applied to the decision tree, said decision tree can be further optimised to the present conditions in such a way that the selection of the extrapolation function used for the trend analysis is optimised. It is thus possible to carry out trend analysis and trend prediction, which are adapted to the given circumstances, which already take into account the dynamic behaviour of the system to be examined or the component to be examined. In this way, in particular the reliability of the trend analysis and the trend prediction is increased with respect to a long-term prediction.

By means of the method for trend analysis and trend prediction according to the invention, it is now possible to determine future servicing times in an advantageous manner in such a way that said times are adapted to the respective actual conditions of the examined system or component. In this way, it is possible to align future servicing and maintenance periods to the actual conditions in a very precise manner, without having to carry out a previous, precise survey of the condition of the analysis of the system or examined component. In particular, unnecessary servicing is prevented from being carried out. This leads to significant cost reductions. Conversely, maintenance work is prevented from erroneously not being carried out, even though said work would be necessary due to the condition of the system or component. This increases the associated comfort for the associated passengers.

Suitably selected decision trees are essential components of the invention. Decision trees are organised, targeted tree diagrams which show decision rules. They hierarchically show sequential decisions. They are significant in a number of fields in which automatic classification takes place or formal rules are represented or derived from practical knowledge. Decision trees are a method for automatically classifying data objects and thus for solving decision problems. They are also used for clearly representing formal rules.

A decision tree always consists of a root node which acts as an input node for an input vector, any number of internal nodes and at least two leaves. Each node thus represents a logical rule, which is also referred to as an attribute. A property associated with a respective node of the decision tree is assigned to an attribute, which property thus functions in general as a feature, an indicator or information details of the node. A leaf corresponds to the classification. Each leaf contains an answer to a complex decision problem, which is also referred to as a classification. More or less complex classification functions are thus associated with the leaves. The complexity and semantics of the rules are not restricted from the outset. In the case of binary decision trees, each rule expression can only attain one of two values.

In order to read a classification of an individual data object on the decision tree, said decision tree is followed downwards starting from the root node. At each node, an attribute is queried and a decision is made on the selection of the following node. This procedure continues until a leaf is reached. The leaf corresponds to the classification.

A great advantage of decision trees is that they are easily explained and comprehensible. This allows the user to evaluate the result and to identify key attributes. This is useful above all if basic properties of the data are not known from the outset. The introduction of decision trees is also an important approach in data mining. Data mining is understood to mean the systematic use of methods, which are usually mathematically-statistically based, on a database with the object of identifying patterns or trends therefrom.

Advantageous configurations and developments of the invention are provided in the further dependent claims and in the description with reference to the figures of the drawings.

In a preferred configuration, at least one input vector is initially provided before the iterative calculation, which input vector is provided as the input vector for the decision tree. The input vector is derived from a time-dependent series of data points of a predetermined length. The data points represent a measured physical value of the component or system to be examined, which data points are available, for example, in the form of a time-continuous data measurement signal. Typically, the analogue data measurement signal is scanned to generate the time-dependent series of data points, in order to determine discrete data points as a result. For determining the input vector, a predetermined time period is provided within which the predetermined number of data points lies. In this case, a fixed predetermined number of data points, that is to say a series of data points of a predetermined length, are always used for a respective input vector. Preferably, but not necessarily, the data points within the time period are arranged so as to be equidistant from adjacent data points.

In a typical configuration, the oldest data point within the time-dependent series of data points is removed during iterative calculation each time a newly calculated data point is added to the time-dependent series of data points, in such a way that the newly provided input vector is provided without the oldest data point. In this way, for the iterative calculation of future data points, the newest data points are always used to generate the input vector.

In a preferred configuration, the iterative calculation of new data points is terminated after a predetermined number of iteration steps. For example, as a termination criterion it can be provided that the number of calculated future data points is less than that of the data points of a series of data points which are used for the input vector or for generating and training the decision tree. This termination criterion is based on the understanding that a trend prediction can only be made for a limited time range in the future. With respect to the reliability of the trend prediction, this time range should be sufficiently less than the measurement data available for trend prediction. In principle, it would be possible to make a trend prediction provided that the number of iteratively calculated future data points and thus the future time period were greater than the time period of the measured data signal which is available for generating the decision tree. However, the certainty of the trend prediction would then decrease. Additionally, this makes sense only in systems which change very slowly. If an error determined during calculation of a subsequent data point exceeds a predetermined threshold, the calculation is terminated. Additionally or alternatively, it would also be conceivable for the termination criterion to then be set if an error determined during calculation of a subsequent data point exceeds a predetermined threshold, or, in other words, if the certainty determined during iterative calculation of a subsequent data point falls below a critical threshold. In this way, it can be ensured that the future data points determined during iterative calculation indicate the future data points with a high level of certainty.

In a more preferred configuration, an extrapolation function of this type of the decision tree is used during iterative calculation of subsequent data points for the newly calculated data point which has the highest value in relation to the input vector used.

In a more preferred configuration, after the iterative calculation, an evaluation of the subsequent data points determined by means of the optimised decision tree is carried out. In particular, the thus determined future data points are each compared with a critical threshold value. The critical threshold value can for example represent a warning threshold above which, for example, action must be taken on one of the examined components or systems. In this way, by means of a very simple analysis and trend prediction which in particular can be carried out during operation, a very reliable statement can be made indicating when the next maintenance cycle is required. No dedicated, complex analysis and evaluation steps are necessary, since the method according to the invention can be carried out in a fully-automated manner. The method according to the invention also provides very high certainty depending on how detailed and precise a manner in which the decision tree optimisation and evaluation of the determined data are carried out. Since the method according to the invention can be computer-controlled and can be carried out in a fully-automated manner, a plurality of measurement data can be handled, in such a way that simple and reliable trend analysis can be carried out in complex systems.

It is more preferred that the method according the invention can be used in a system configured as an air-conditioning system in an aircraft or spacecraft, in which system for example an oscillation (vibration or sound) generated by the air-conditioning system is measured as an examined physical parameter. This is particularly advantageous since oscillations of this type typically only change very slowly, for example in the case of an increasingly dirty recirculation filter, and thus a very simple trend analysis is possible in the case of a change in the oscillation characteristics. This change can be easily and reliably identified by condition monitoring which is carried out at regular intervals. If, for example, an element of the air-conditioning system were faulty, such as the recirculation filter or the fan, this manifests for example as an increase in vibrations. The trend of these vibrations can then be derived therefrom. However, the invention is not restricted to measurement and evaluation of a physical parameter in the form of oscillations, but can, for example, be broadened to other physical parameters such as temperature, weight, EMC radiation, electrical currents and voltages, etc. If, for example, an element of the air-conditioning system were faulty, such as the recirculation filter or the fan thereof, this can also manifest for example as an increase in temperature which can thus be measured and evaluated as an indication of the condition of this system.

In a typical configuration, a feature vector is initially calculated for the step of providing an optimised decision tree. Training data and a parameter set are provided for calculating the feature vector.

The parameter set preferably contains parameters of the type which are required for creating the feature vector and which in particular comprise at least one of the following parameters:

a number of data points of a series of data which are used for trend prediction. This first parameter defines how many data points are required at the least for the trend analysis of the subsequent data point.

a calculation of the gradient of the series of data which is used for the trend prediction. This calculation rule defines whether each data point, every other data point or, for example, only the first and the last data point are used within the time period of the series of data points for calculating the gradient.

a calculation of the minimum and/or maximum values of the data points used for the trend prediction within the time period of the series of data points.

the extrapolation functions available for the trend analysis. This parameter decides which of the available classifications and thus extrapolation functions should be used for defining a data point. For example, a linear function, a sinusoidal function, an exponential function, a quadratic function, etc., can be provided here.

Additionally or alternatively, it is naturally also conceivable to use other parameters for the predetermined parameter set, such as reversal points of a predetermined portion of a measured data signal, the derivation thereof, an error in the calculation of the data points, correction values and the like.

In a preferred configuration, a physical value of the component or system to be examined is measured for the provision of the training data. Data points can then be generated from the thus determined data measurement signal, for example by sampling. By selecting a predetermined number of data points from these scanned data points, the time-dependent series of data points can then be formed, which form the series of data points required for determining the training data.

Preferably, at the start, that is to say at the beginning of the determination of the feature vector, which is provided for generating a decision tree, random values are determined as the parameter set. This parameter set determines the calculation of the feature vector. Using the training data and the parameter set, an increasingly optimised decision tree is then iteratively calculated starting from the random values until an error of the decision trees falls below a predetermined threshold value. In particular, a parameter set is optimised until a stable value results. A stable value can then be available if, for example, the parameter set no longer changes. A starting point is then that this determined and thus optimised parameter set is optimised in relation to the decision tree and the training data. The parameter set typically changes with each iteration of the optimisation, the change typically becoming increasingly smaller with increasing iteration. The termination criterion, with which the iteration for determining the optimised parameter set is concluded, is a function of the respectively selected termination criteria. For example, a highest accuracy in the optimisation algorithm used can also be provided as the termination criterion. Typically, however not necessarily, a genetic algorithm is used as the optimisation algorithm. This is very easy to implement and gives comparatively very good results.

In an advantageous configuration, the decision tree is calculated using an ID3 (Iterative Dichotomiser 3) algorithm or a C4.5 algorithm, the optimised feature vector, calculated in the context of the optimisation of the parameter set, being provided as an input vector. In addition to these algorithms, it would also be conceivable to use a CART (Classification and Regression Trees) algorithm or a CHAID (Chi-square Automatic Interaction Detectors) algorithm. The ID3 algorithm is used if a plurality of different attributes are significant in large data sets and therefore a decision tree is to be generated without large calculations. The decision trees generated by an ID3 algorithm are usually very simple in their construction. In a CART algorithm, only binary decision trees can be generated, that is to say, exactly two branches are available at each fork. The central element of the CART algorithm is therefore finding an optimum binary division. The C4.5 algorithm behaves in a very similar way to the CART algorithm, it not being necessary to carry out any binary division in the C4.5 algorithm, and instead any number of forks being able to be incorporated, and this is highly advantageous for many applications. In this way, the decision tree of the C4.5 algorithm becomes wider; however it is usually also less deep. For this, the subsequent divisions become less significant after the first classifications. In contrast to the other algorithms, in the CHAID algorithm growth of the decision tree is stopped before the tree becomes too large.

Preferably, after the generation thereof, the decision tree is trained by iteration with reference to dedicated learning data. This learning or training phase of the decision tree is not necessarily but advantageously provided. In principle, the learning data can have a syntax corresponding to that of the training data, that is to say a number of data points can likewise be used as learning data, which data points were determined for example either by measuring or in another way and which contain a time-dependent series of data points.

In a more preferred configuration, when generating the decision tree, in addition to the respectively calculated extrapolation function, a deviation value is calculated which gives information on how far and how significantly the calculated data point deviates from an optimum value. This additional information thus provides an accuracy of the determined data point. If the deviation values of the future data regarding the iterations are added together, this provides an estimated prediction error. In this way, in addition to a trend prediction for future data points, a probability of these future calculated data points having been correctly calculated can be provided.

In a preferred configuration, the device according to the invention is configured as an electronic measuring box and in particular as a temperature and/or oscillation measuring box. This electronic measuring box comprises an interface via which the measuring box can be attached to the component or system to be examined. The data respectively required for the trend prediction and thus the associated physical measured value can thus be determined by direct or indirect measuring via the electronic measuring box. In the case of a temperature measurement, the electronic measuring box comprises for example a sensor configured as a temperature sensor which detects the temperature of the component or system to be examined. In the case of vibration or another oscillation, associated vibration or oscillation sensors are provided.

The above configurations and developments can, where appropriate, be combined with one another in any way. Further possible configurations, developments and implementations of the invention also comprise combinations, which have not been explicitly stated, of features of the invention described either above or below with respect to embodiments. In particular, the person skilled in the art will in this case add individual aspects to the respective basic form of the invention by way of improvement or addition.

BRIEF DESCRIPTION OF THE DRAWINGS

The present invention is explained in greater detail below with reference to the embodiments provided in the schematic figures of the drawings, in which.

The appended drawings are intended to provide further understanding of the embodiments of the invention. They show embodiments and explain principles and concepts of the invention in connection with the description. Other embodiments and many of the stated advantages result with respect to the drawings. The elements of the drawings are not necessarily shown to scale.

In the figures of the drawings, identical, functionally identical and identically operating elements, features and components are each provided with the same reference symbol, unless stated otherwise.

DETAILED DESCRIPTION OF THE EMBODIMENTS

Figure 1:
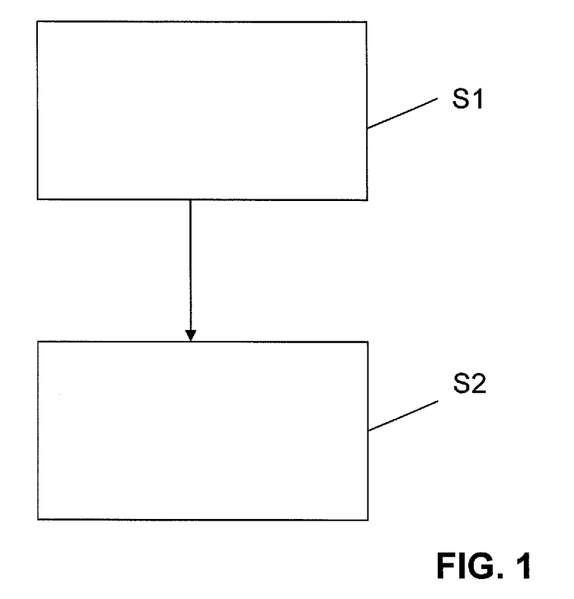
FIG. 1 is a flow chart for showing the flow of a first, general embodiment of the method according to the invention.

FIG. 1 is a flow chart for showing the flow of a first, general embodiment of the method according to the invention.

The method according to the invention is a method for trend prediction of the course of a time-dependent series of data points. It is assumed that the condition of a system of an aircraft, and here in particular of an air-conditioning system, is to be determined using this trend prediction. This condition is to be derived from a vibration of the air-conditioning system generated by the air-conditioning system or alternatively also from the temperature of the air-conditioning system.

At S1, an optimised decision tree is initially provided. The generation of the optimised decision tree is described in the following in greater detail with respect to FIGS. 2 and 3. A suitably selected input vector, which is derived from a series of data points, is input into the root node. The nodes of the decision tree indicate the attributes of the input vector, for example the data points of a respective input vector. The leaves each represent an extrapolation function.

Measured data points can be used as input data for the decision tree, in the same manner as they were also used for example for the generation of the feature vector for generating the decision tree. In this case, the input data for the decision tree can also be pre-processed in a suitable way, for example by only using corresponding, representative input data.

At S2, future data points are then calculated with reference to the optimised decision tree. The calculation is carried out in that an input vector is input into the decision tree, the input vector containing a time-dependent series of measured data points or being derived therefrom. The decision tree determines therefrom, in an automated manner, a data point subsequent to the last data point of the time-dependent series of measured data points. This thus calculated, subsequent data point is then added to the time-dependent series of data points, which are then in turn used for determining a new input vector for the next iteration step. In this way, further future data points are iteratively determined.

Figure 2:
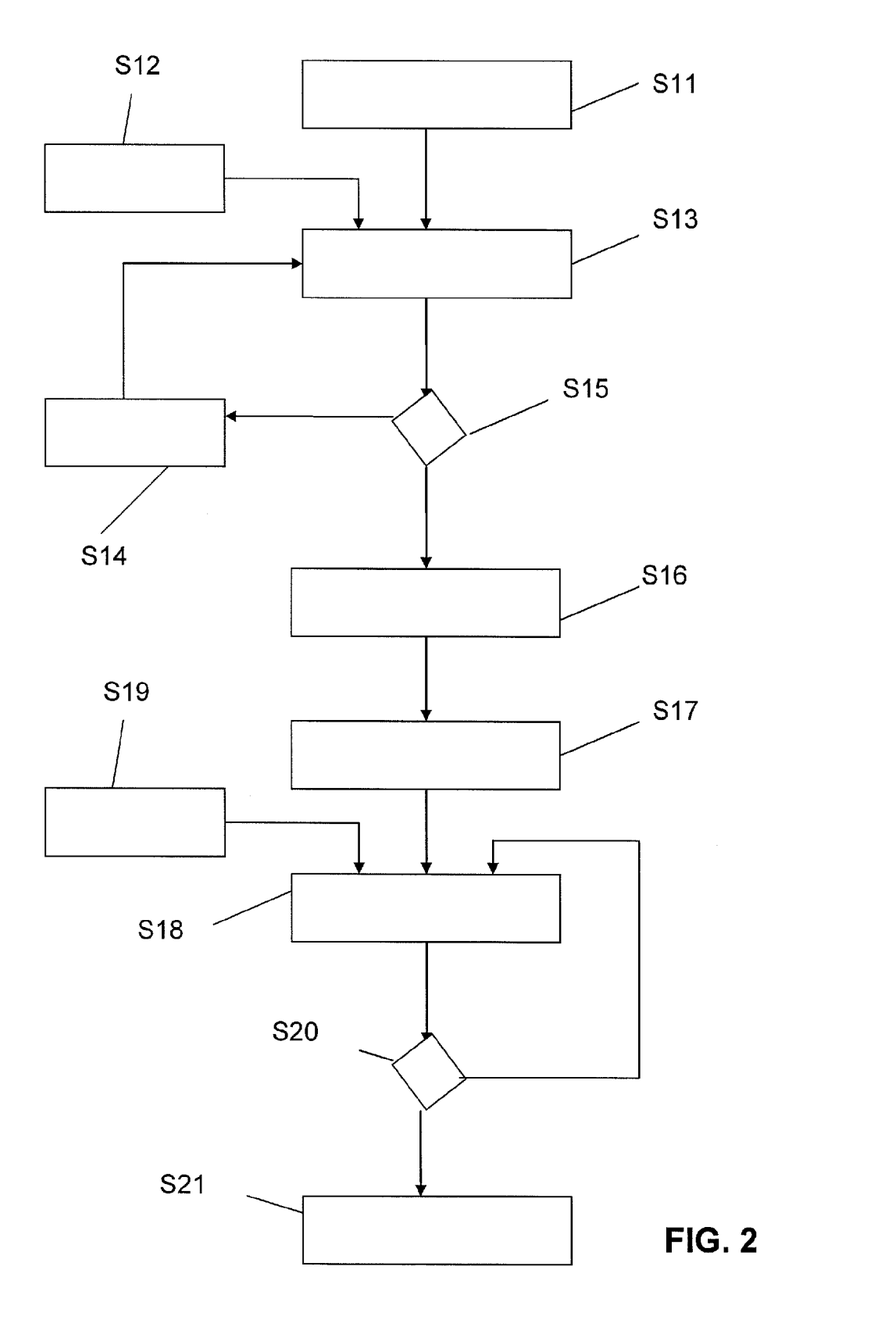
FIG. 2 is a flow chart for showing the flow of a second, preferred embodiment of the method according to the invention.

FIG. 2 is a flow chart for showing the flow of a second, preferred embodiment of the method according to the invention.

At S11, a starting parameter set is initially generated which is provided for analysing the time-dependent series of data points. Various parameters which can have an influence on the generation of the decision tree can be used. The parameters are typically determined by the user. The parameters associated with the parameter set can be, for example:

- Length of a data series, that is to say number of data points of a data series used for a trend prediction;
- Gradient of the data points of a data series used for the trend prediction, for example an incline between two data points, for example the first and the last data point or also any other data points;
- Minimum/maximum values of the data points of a data series used for the trend prediction;
- Number of data points of a series of data provided for training a decision tree;
- Length of a data series of data points of a series of data necessary for trend prediction;
- Number and type of the extrapolation functions used in the decision tree for classification.

At S11, the parameters used in the starting parameter set are initially arbitrarily selected, for example by randomly setting a value for the respective parameters. These parameters are optimised in a subsequent, still to be described process using a suitable optimisation algorithm.

At S12, one or more series of data points are initially provided. The series of data points can for example be generated by measuring a physical measured value, in the present case, for example, vibrations. If the measured data signal is available in the form of a time-continuous analogue data measurement signal, the various data points for generating the time-dependent series of data points, for example by sampling the data measurement signal, can be generated. The thus obtained data measurement points are therefore available in a discrete form.

At S13, the thus generated time-continuous data points together with the initial, random parameter values from the parameter set provided at S11 undergo data analysis. In this data analysis, one or more of the following analysis steps can be carried out:

Any time period of the determined, time-continuous series of data points (also referred to in the following as a data period) can initially be selected. This arbitrary time period should however be of a defined length, within which a predetermined number of data points are provided. An interpolation function is calculated from the thus selected data period of the measured data signal. This interpolation function can initially be any function. Typically however, an interpolation function is calculated of the type which corresponds approximately to the course of the selected data period. This interpolation function defines a classification of the selected data period, which is later used for determining an extrapolation function in the generation of the decision tree.

Additionally or alternatively, it would be conceivable for, at the start and the end of the selected data period, a predetermined number of data points to be removed. The thus resulting data period can then be further processed and evaluated, for example using known mechanisms. It would be conceivable, for example, for inclines and the like to be calculated in addition to the calculation of the interpolation function and thus also the classification of corresponding maximum and minimum values.

The thus determined series of data points together with the additional classification information, that is to say the interpolation function associated with the respective series of data points, is optimised at S14 together with the parameter set. Known optimisation algorithms, for example a genetic algorithm, can be used for this optimisation.

Genetic algorithms of this type refer to algorithms which can also deal with problems which cannot be solved analytically by repeatedly generating various suggested solutions. In these repeated suggested solutions, that is to say the optimisation steps, they change the respective input data and they combine with one another in order to obtain a selection. Suggested solutions for the subsequently used input data are determined as output data, which with increasing iteration and optimisation correspond increasingly well to the stipulated requirements. Genetic algorithms of this type are heuristic optimisation methods and are counted among the evolutionary algorithms. Above all, they are used for problems of the type for which a closed solution cannot be calculated or cannot be calculated efficiently. A memetic algorithm would also be conceivable for optimisation instead of genetic algorithms. However, genetic algorithms are the simplest evolutionary optimisation methods, which are also very quick to implement and can be adapted to new problems.

With each iteration, what is known as a feature vector is generated which, in relation to the data points of the data period, contains an interpolation function or, generally, classification information and corresponding, optimised parameter values of the parameter set. This feature vector typically changes with each iteration and thus with each optimisation step. With increasing iteration and thus as the optimisation S14 is progressively carried out, for the data points selected at the outset within the data period, optimised classification information, that is to say an optimised interpolation function, and optimised parameter values of the parameter set result.

This optimisation algorithm S14 is carried out until a termination criterion is reached. As a termination criterion, at S15 it can be provided for example that the parameter of the parameter set generated by optimisation and the determined interpolation function have reached a stable value which for example no longer changes the value thereof. It would also be conceivable for a calculated error to fall under a certain predetermined value. Typically, the termination criterion is also a function of the optimisation algorithm used. For example, it can be provided within the optimisation algorithm that a maximum accuracy is aimed for. If this maximum accuracy is achieved in the optimisation, the termination of the optimisation can be determined.

Subsequently, at S16, the decision tree is generated in a known manner. For the generation of the decision tree, an algorithm known per se, such as the ID3 algorithm or the C4.5 algorithm, is used. For generating the decision tree, the feature vector generated and optimised at S14 is used, which therefore contains respective classification information and corresponding parameter values for the series of data points used at the outset. A decision tree is thus generated of which the leaves contain an extrapolation function. The nodes of the decision tree contain the attributes of the feature vector, that is to say the information derived from the data points of the data period to be examined.

At S17, the thus generated decision tree can be trained with reference to learning or test data. In this way, the generated decision tree can be further refined.

Subsequently, a trend prediction is carried out at S18. In the trend prediction, a decision tree is used, as was determined for example at S17, or also without a learning cycle at S16. A series of data points, that is to say a data period, is provided at S18 as an input vector for the decision tree.

The data period used for the trend prediction is determined at S19 and is pre-processed in a suitable way. In this way, a physical measured value can be measured, for example the vibrations generated by the air-conditioning system of an aircraft. From this measured data signal, corresponding data measurement points can be determined at regular intervals, which points are used as an input signal for the trend prediction. A predetermined number of data points determined in this way form the input vector for the decision tree for the purposes of trend prediction.

The trend prediction at S18 can be carried out analogously to the mechanisms already shown with reference to FIG. 1. The input vector is coupled into the decision tree in this trend prediction. Starting from this point, the most suitable extrapolation function is selected by the decision tree and is then used for calculating the next data measurement point. The thus calculated and predicted data measurement point is then used again as the last data measurement point for forming a new input vector. A new data measuring point is then determined in turn in the same way on the basis of the thus changed input vector. This is carried out until a termination condition determines the termination of the trend prediction at S20.

An evaluation of the thus determined future data points is then carried out at S21. In the context of this evaluation, it can be provided for example that the value of the determined data measurement points can be compared with a predetermined threshold value. If, for example, one or more of the thus determined future data measurement points exceeds (or falls below) a predetermined threshold value, conclusions can be drawn therefrom on the condition of the air-conditioning system. In specific cases, it can for example be provided that the determined future vibration values are compared with a predetermined vibration threshold. If the future vibration values determined by the trend prediction exceed this vibration threshold, it can be concluded that the condition is increasingly deteriorating, which manifests for example in the air-conditioning system heating up. Since it is known, as additional information, at which future point in time the critical vibration threshold will be exceeded and thus when heating up of the air-conditioning system will occur, information can also be obtained therefrom when this condition is reached. In this way, in a very advantageous manner, it is possible to adjust the associated servicing and maintenance intervals precisely to the requirements which are determined by trend prediction. In particular, it can be determined in good time when the next servicing or maintenance is required, for example before the next departure of an aircraft occurs, and preferably even several days before.

Figure 3:
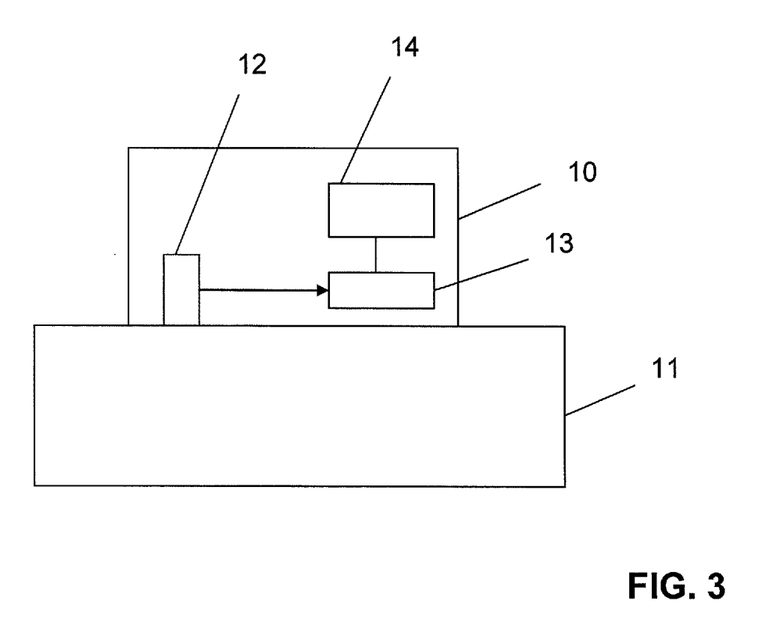
FIG. 3 is a block diagram of a device according to the invention.

FIG. 3 is a block diagram of a device according to the invention. The device according to the invention, which is denoted here by reference symbol 10, is a measuring box for determining and evaluating the vibrations of a component or system of an aircraft. In the present embodiment, this system is the air-conditioning system 11 of an aircraft.

In the example shown, the measuring box 10 according to the invention is arranged so as to be in direct contact with the air-conditioning system 11 and, in particular in this case, with a vibration-relevant region of the air-conditioning system 11. The measuring box 10 according to the invention comprises a measuring device 12, a memory 13 and a calculation and evaluation device 14. In the example shown, the measuring device 12 is configured as a vibration sensor. This vibration sensor 12 is configured so as to measure vibrations in the vibration-relevant region of the air-conditioning system 11, in order to determine therefrom a time-dependent series of data points in a previously described manner. This time-dependent series of data points can initially be stored in a memory. An optimised decision tree is generated by means of the calculation and evaluation device 14, for example by using a method described in greater detail with reference to FIGS. 1 and 2. Furthermore, a trend prediction with respect to the time-dependent series of data points determined by the measuring device 12 can be calculated by the calculation and evaluation device 14 and with reference to the generated and optimised decision tree.

In further embodiments, the system of an aircraft can be a further component of an aircraft, for example an electrical component of an aircraft or a mechanical component of an aircraft.

If the system of an aircraft is configured as an electrical component of an aircraft, the component can, for example, be configured as an electric motor, another electrical actuator, an electrical sensor, an electrical control device, an electrical component of the aircraft controls, an electrical cockpit instrument or the like.

In an embodiment of this type, the measuring box 10 comprises a measuring device 12, which for example is configured as a sensor and is configured so as to measure an electrical current consumed by the respective component, an electrical supply voltage, a temperature or other electrical values. If the electrical component is configured as an electric motor, the sensor 12 can also be configured so as to measure rotation, torque or the like of the rotor axle of the electric motor.

If the system of an aircraft is configured as an mechanical component of an aircraft, the component can, for example, be configured as an electric motor, a turbine, a mechanical adjusting member, a control surface of the aircraft, for example a rudder, an elevator, an aileron or a landing flap, or the like.

In an embodiment of this type, the measuring box 10 can comprise a measuring device 12, which for example is configured as a sensor and is configured so as to measure acceleration, vibration, movement, for example translational or rotational movement, temperature, pressure or the like.

In an embodiment of this type, the calculation and evaluation device 14 has at least one interface via which the calculation and evaluation device 14 can record data from the measuring device 12. This interface can for example be an analogue, voltage-based or current-based interface. The interface can however also be configured as a digital interface, for example an SPI, I$^2$C, CAN, LIN interface or the like.

In an embodiment, the calculation and evaluation device 14 is configured so as to randomly create the starting parameter set. Finally, the calculation and evaluation device 14 is configured so as to generate a decision tree using the starting parameter set and to optimise said tree with reference to the series of measured values detected by the measuring device 12. The calculation and evaluation device 14 can use measured values from the series of measured values in the optimisation of the decision tree in order to control the quality of the decision tree. In this way, the decision tree is optimised, for example together with a quantity of measured values which lie at the start of the series of measured values. For checking the quality of the decision tree, future measured values can then be calculated on the basis of the decision tree and can be compared with the further measured values contained in the series of measured values. In an embodiment, a maximum difference between the calculated future measured values and the further measured values of the series of measured values is predetermined. If the actual difference is consequently below this predetermined threshold value, the decision tree has been sufficiently optimised.

For monitoring a component of an aircraft, the calculation and evaluation device 14 continuously detects measured values from at least one measuring device 12 and creates a measured series from these measured values. In this way, the length of the measured series can be predetermined or variable. The measured series can then, in an embodiment, directly act as an input vector of the decision tree. In a further embodiment, the calculation and evaluation device 14 can extract certain features of the measured series, for example the length of the measured series, a gradient between at least two points of the measured series, minimum or maximum values or the like from the measured series, and can use these extracted features as an input vector for the decision tree.

Consequently, the calculation and evaluation device 14 goes through the decision tree, which gives an extrapolation function for calculating future values of the measured series.

The calculation and evaluation device 14 calculates future values of the measured series using the extrapolation function.

In an embodiment, the calculation and evaluation device 14 consequently compares these future values of the measured series with predetermined threshold values. In this case, the threshold values predetermine, for example, a maximum temperature, a maximum electrical voltage, a maximum electrical current, maximum vibration and the like. If one of the future values of the measured series exceeds the predetermined threshold value, in an embodiment, the calculation and evaluation device 14 can output this information and the estimated point in time at which the threshold value is exceeded in reality, for example to a diagnostic system of the aircraft.

Although the present invention has been fully described with reference to preferred embodiments, it is not restricted thereto, but can be modified in many different ways.

The present invention is thus not necessarily to be restricted to application in an aircraft or spacecraft, although the invention is particularly preferably used in passenger aircraft. In particular it is particularly advantageous here in order to be able to effectively make use of the short immobilisation times between landing and take-off for servicing and installation work. However, it goes without saying that the present invention can also be used for other applications, for example in ships, buses, railways and the like. In particular, the present invention would also be more preferred for application in automotive engineering.

Additionally, the invention need not necessarily be usable for trend prediction of data points determined from the vibration measurement. In addition to temperature, other measuring parameters such as temperature or also acoustic oscillations (sounds) and the like would, as already mentioned, advantageously also be usable as physical values for trend prediction.

In addition to the mentioned algorithms for generating the decision tree or for data optimisation, other algorithms would naturally also be advantageously usable.

Furthermore, it goes without saying that the numerical values provided serve only for improved clarity, however the invention is not to be restricted thereby.

It also goes without saying that, in the above embodiments, only preferred embodiments have been described, which can however be changed or modified in various ways. For example, it would also be conceivable to omit various method steps from the method for trend prediction which is described above with reference to FIG. 2, such as termination conditions or termination steps, learning or training steps and the like, or to add further method steps to said method.

What is claimed is:

1. A computer-implemented method for predicting the condition of a component or system, in particular for an aircraft or spacecraft, by trend prediction of the course of a time-dependent series of data points determined at the component or system by measuring, the method comprising:
    providing an optimised decision tree, the input node of which is provided for inputting an input vector, the nodes of which contain the attributes of the respective input vector and the leaves of which each contain an extrapolation function provided for trend prediction;
    iteratively calculating future data points by an input vector being derived from a time-dependent series of data points and the decision tree calculating a data point subsequent to the last data point of the time-dependent series of data points from the input vector in an automated manner, the calculated subsequent data point being added to the time-dependent series of data points in order to be used for forming a new input vector for the next iteration step.

2. The method according to claim 1, wherein at least one input vector is initially provided before the iterative calculation, which input vector is derived from a time-dependent series of data points of a predetermined length, the data points representing a measured physical value of the component or system.

3. The method according to claim 1, wherein the oldest data point is removed during iterative calculation each time a newly calculated data point is added to the time-dependent series of data points.

4. The method according to claim 1, wherein the iterative calculation of new data points is terminated after a predetermined number of iteration steps and/or if an error determined during calculation of a subsequent data point exceeds a predetermined threshold.

5. The method according to claim 1, wherein an extrapolation function of this type of the decision tree is used during iterative calculation of subsequent data points for the newly calculated data point for which a newly calculated data point has the highest value in relation to the input vector used.

6. The method according to claim 1, wherein an evaluation of the determined subsequent data points is carried out after the iterative calculation, in particular by the determined subsequent data points being compared with a critical threshold value.

7. The method according to claim 1, wherein the temperature of the component or system and/or an oscillation generated by the component or system is measured as a physical parameter, the system being in particular an air-conditioning system in an aircraft or spacecraft.

8. The method according to claim 1, wherein for the provision of an optimised decision tree, a feature vector is initially calculated which is determined from training data and a parameter set.

9. The method according to claim 8, wherein the parameter set preferably contains parameters of the type which are required for creating the decision tree and which in particular comprise at least one of the following parameters:
 a number of data points of a series of data which are used for trend prediction;
 a calculation of the gradient of the series of data which is used for the trend prediction;
 a calculation of the minimum and maximum values of the data points of a series of data which are used for the trend prediction;
 the available extrapolation function of a series of data.

10. The method according to claim 8, wherein a physical value of the component or system is measured for the provision of the training data and a predetermined number of data points are generated from the thus determined data signal by sampling, which data points form the time-dependent series of data points.

11. The method according to claim 8, wherein random values are determined for the parameter set at the start, and wherein, using the training data and the parameter set, an increasingly optimised feature vector and decision tree is iteratively calculated until an error of the optimised decision tree falls below a predetermined threshold value.

12. The method according to claim 1, wherein the decision tree is calculated using an ID3 algorithm or a C4.5 algorithm, the feature vector, optimised in the context of the optimisation of the parameter set for determining the decision tree, being provided as an input vector.

13. The method according to claim 1, wherein in addition to the respectively calculated future data point, during iterative calculation of future data points an error value is also calculated showing how far the calculated data point deviates from an optimum value.

14. A device for predicting the condition of a component or system, in particular for an aircraft or spacecraft, in particular using a method according to claim 1, the device comprising:
 a measuring device which is configured so as to measure a physical measured value at the component or system for generating a time-dependent series of data points;
 a memory in which at least one time-dependent series of data points can be stored; and
 a calculation and evaluation device which is configured so as to generate an optimised decision tree with reference to at least one of the time-dependent series of data points and to carry out a trend prediction with reference to the thus generated decision tree.

15. A non-transitory computer-readable storage medium with an executable program stored thereon, wherein the program instructs a microprocessor to perform a method according to claim 1.

* * * * *